United States Patent
Mori et al.

(10) Patent No.: US 12,345,310 B2
(45) Date of Patent: Jul. 1, 2025

(54) SEALING DEVICE

(71) Applicant: NOK CORPORATION, Tokyo (JP)

(72) Inventors: Tatsuya Mori, Fukushima (JP); Yu Yamaguchi, Fukushima (JP); Masamichi Kishiro, Fukushima (JP); Toshiaki Yamauchi, Fukushima (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 18/033,740

(22) PCT Filed: Oct. 15, 2021

(86) PCT No.: PCT/JP2021/038199
§ 371 (c)(1),
(2) Date: Apr. 25, 2023

(87) PCT Pub. No.: WO2022/107516
PCT Pub. Date: May 27, 2022

(65) Prior Publication Data
US 2023/0392665 A1   Dec. 7, 2023

(30) Foreign Application Priority Data
Nov. 18, 2020 (JP) ................. 2020-191514

(51) Int. Cl.
*F16F 9/36* (2006.01)
*F16J 15/18* (2006.01)
*F16J 15/3232* (2016.01)

(52) U.S. Cl.
CPC ............. *F16F 9/36* (2013.01); *F16J 15/18* (2013.01); *F16J 15/3232* (2013.01); *F16F 2230/30* (2013.01)

(58) Field of Classification Search
CPC ........ F16J 159/36; F16J 15/18; F16J 15/3232; F16J 15/3248; F16J 15/3252; F16J 15/3268; F16J 15/3284; F16F 9/36
See application file for complete search history.

(56) References Cited

U.S. PATENT DOCUMENTS 3,848,880 A * 11/1974 Tanner .............. F16J 15/32
    277/467
4,949,819 A * 8/1990 Beutel ............. F16F 9/36
    267/152

(Continued)

FOREIGN PATENT DOCUMENTS

EP    1729045 A1    12/2006
FR    2797672 A1    2/2001

(Continued)

OTHER PUBLICATIONS

International Search Report (in English and Japanese) issued in PCT/JP2021/038199, mailed Dec. 14, 2021; ISA/JP (4 pages).

(Continued)

*Primary Examiner* — Christine M Mills
*Assistant Examiner* — L. Susmitha Koneru
(74) *Attorney, Agent, or Firm* — Harness, Dickey & Pierce, P.L.C.

(57) ABSTRACT

A sealing device includes a seal housing disposed between a cylinder and a rod, an inner seal disposed between the rod and the seal housing, the inner seal being in contact with the rod, and an outer seal disposed between the inner seal and the seal housing, the outer seal being in contact with both the inner seal and the seal housing, in which one of the outer seal and the seal housing has a contact face that is in contact with the other of the outer seal and the seal housing, and the contact face has a concave portion.

4 Claims, 8 Drawing Sheets

(56) References Cited

U.S. PATENT DOCUMENTS

| | | | | |
|---|---|---|---|---|
| 5,346,230 | A * | 9/1994 | Schumacher | F16J 15/3236 |
| | | | | 277/925 |
| 6,454,273 | B1 | 9/2002 | Kashima et al. | |
| 8,360,534 | B2 * | 1/2013 | Vom Stein | F16J 15/344 |
| | | | | 305/106 |
| 8,827,381 | B2 * | 9/2014 | Dolata | F16J 15/344 |
| | | | | 277/402 |
| 9,933,071 | B2 * | 4/2018 | Ryther | F16J 15/3208 |
| 2006/0185952 | A1 | 8/2006 | Kojima | |
| 2015/0316119 | A1 | 11/2015 | Lehnen et al. | |
| 2017/0138432 | A1 | 5/2017 | Takeuchi | |
| 2019/0277365 | A1 * | 9/2019 | Kubota | F16J 15/3232 |
| 2020/0325989 | A1 | 10/2020 | Mori | |
| 2021/0140507 | A1 | 5/2021 | Cho et al. | |

FOREIGN PATENT DOCUMENTS

| | | | |
|---|---|---|---|
| GB | 2353336 | A | 2/2001 |
| JP | 2000-346202 | A | 12/2000 |
| JP | 2006226424 | A | 8/2006 |
| JP | 2010-223282 | A | 10/2010 |
| JP | 2015218817 | A | 12/2015 |
| WO | 2018-0181210 | A1 | 10/2018 |
| WO | 2019-176784 | A1 | 9/2019 |

OTHER PUBLICATIONS

Extended European Search Report for corresponding European Patent Application No. 21894390.0 dated Sep. 9, 2024 (9 Pages).

* cited by examiner

SEALING DEVICE

CROSS REFERENCE TO RELATED APPLICATIONS

This application is a U.S. National Phase Application under 35 U.S.C. 371 of International Application No. PCT/JP2021/038199, filed on Oct. 15, 2021, which claims priority to Japanese Patent Application No. 2020-191514, filed on Nov. 18, 2020. The entire disclosures of the above applications are expressly incorporated by reference herein.

BACKGROUND

Technical Field

The present invention relates to a sealing device.

Related Art

Known in the art are single-cylinder shock absorbers for reducing vibration of a vehicle. Generally, such shock absorbers include a cylinder, a piston slidably inserted into the cylinder, a rod connected to the piston, an annular member held in the cylinder, and a seal member that seals the annular member and the rod.

The seal member described in Japanese Patent Application Laid-Open Publication No. 2006-226424 is subject to a problem in that it may become separated (displaced upward) either partially or entirely from an annular member during assembly of a shock absorber. Also, when the seal member is made up of two members, a gap may form between the two members, as illustrated in FIG. 4. This results in degradation in sealing properties of the seal member. It is desirable to prevent such degradation and maintain sealing properties.

SUMMARY

To solve the above problem, a sealing device according to one aspect of the present invention is a sealing device that seals a cylinder and a rod, the cylinder having a space extending along an axial line, the rod being inserted into the space, the sealing device including: a seal housing disposed between the cylinder and the rod; an inner seal disposed between the rod and the seal housing, the inner seal being in contact with the rod; and an outer seal disposed between the inner seal and the seal housing, the outer seal being in contact with both the inner seal and the seal housing, where one of the outer seal and the seal housing has a contact face that is in contact with the other of the outer seal and the seal housing, the contact face having a concave portion.

A sealing device according to another aspect of the present invention is a sealing device that seals a cylinder and a rod, the cylinder having a space extending along an axial line, the rod being inserted into the space, the sealing device including: a seal housing disposed between the cylinder and the rod; an inner seal disposed between the rod and the seal housing, the inner seal being in contact with the rod; and an outer seal disposed between the inner seal and the seal housing, the outer seal being in contact with both the inner seal and the seal housing, where the outer seal has a contact face that is in contact with a structure constituted by the seal housing and the inner seal, the contact face having a first portion, the first portion being a concave portion or a convex portion, and the structure has a second portion that fits in the first portion.

Effect of the Invention

According to the present invention, the original sealing properties of the sealing device can be maintained.

DETAILED DESCRIPTION

Figure 1:
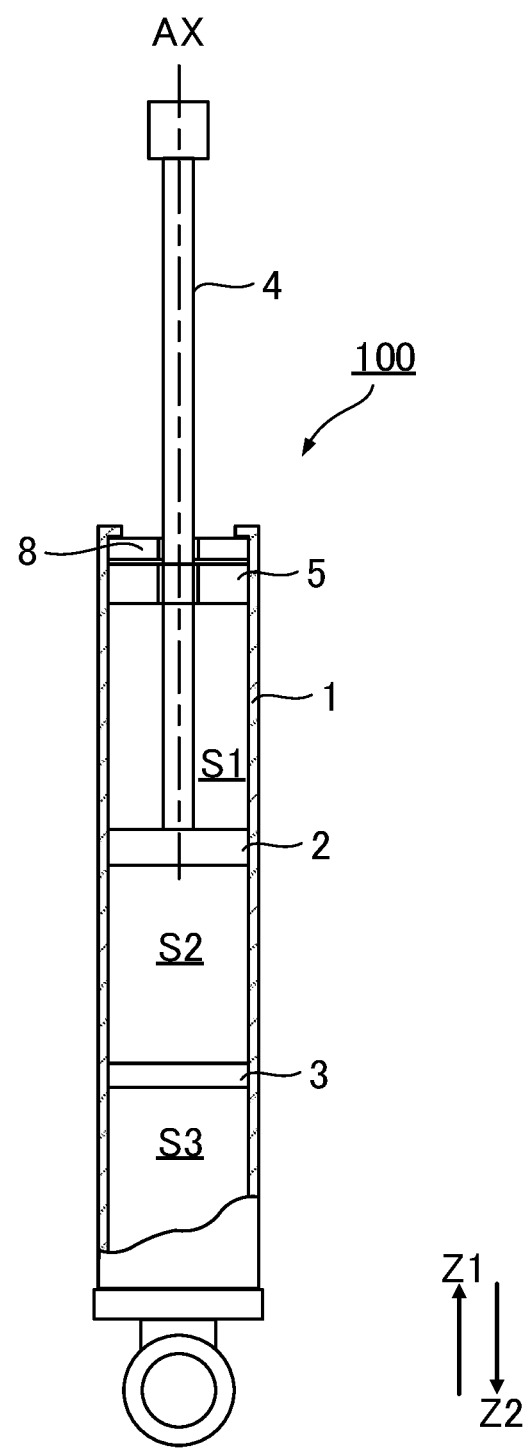
FIG. 1 is a cross-sectional diagram of a shock absorber including a sealing device according to a first embodiment.

Preferred embodiments according to the present invention are explained below with reference to the accompanying drawings. It is of note that dimensions and scales of parts shown in the drawings may differ from those of actual products, and some parts are schematically illustrated for ease of understanding. Further, the scope of the present invention is not limited to the embodiments unless otherwise stated in the following descriptions.

1. First Embodiment

1A. Shock Absorber 100

FIG. 1 is a cross-sectional diagram of a shock absorber 100 including a sealing device 8 according to a first embodiment. In the following descriptions, an upward direction from any point in the diagrams is referred to as the "Z1 direction," and a downward direction from any point downward in the diagrams is referred to as the "Z2 direction" (or "downward.") Both the Z1 direction and the Z2 direction extend along an axial line AX, as will be described later.

The shock absorber 100 illustrated in FIG. 1 is a telescopic damper that damps shock such as vibration. The shock absorber 100 is used in, for example, automobiles or other vehicles. The shock absorber 100 generates a damping force to reduce vibration of a vehicle.

The shock absorber 100 illustrated in FIG. 1 is a single-cylinder shock absorber, and includes a cylinder 1, a piston 2, a free piston 3, a rod 4, a rod guide 5, and the sealing device 8.

The cylinder 1 is made of metal and has, for example, a bottomed cylindrical shape. The cylinder 1 has a space extending along the axial line AX. The piston 2 is slidably disposed in the cylinder 1 and has, for example, a disk shape.

The piston 2 is connected to the rod 4. The free piston 3 is slidably disposed in the cylinder 1 and has, for example, a disk shape.

A space in the cylinder 1 is partitioned (divided) by the piston 2 and the free piston 3 into two oil chambers S1 and S2 and a gas chamber S3. The oil chamber S1 and the oil chamber S2 are partitioned (divided) by the piston 2. The oil chamber S2 and the gas chamber S3 are partitioned (divided) by the free piston 3.

The oil chamber S1 and the oil chamber S2 are each filled with hydraulic oil. Although not illustrated in the drawings, the piston 2 includes a communication passage through which the oil chamber S1 and the oil chamber S2 communicate with each other. A damping valve is a damping-force generating element, and is disposed in the communication passage. The damping valve opens or closes the communication passage depending on a differential pressure between the oil chamber S1 and the oil chamber S2. A damping force is generated by resistance of the hydraulic oil passing between the oil chamber S1 and the oil chamber S2 through the communication passage. The gas chamber S3 is filled with a high-pressure gas. The free piston 3 moves in response to a change in pressure of the hydraulic oil in the oil chamber S2 acting on the free piston 3 as the piston 2 moves.

The rod 4 is made of metal and extends along the axial line AX. The rod 4 includes an end in the Z1 direction and an end in the Z2 direction. The end in the Z1 direction is exposed from the cylinder 1, and the end in the Z2 direction is disposed in the cylinder 1. The end in the Z2 direction is connected to the piston 2. As the piston 2 moves, the rod 4 moves along the axial line AX. The piston 2 moves back and forth inside the cylinder 1, whereby a length changes of a portion of the rod 4 exposed from the cylinder 1.

The rod guide 5 is disposed close to the end of the internal space of the cylinder 1 in the Z1 direction. The rod guide 5 slidably supports the rod 4. Although not illustrated in detail in FIG. 1, the rod guide 5 includes a bush and a rod guide. The bush is a bearing made of metal and is annular in shape. The rod guide is made of metal, is annular in shape, and holds the bush.

The sealing device 8 is disposed between the rod guide 5 and the end in the Z1 direction of the internal space of the cylinder 1. The sealing device 8 seals a space between an inner circumferential surface of the cylinder 1 and an outer circumferential surface of the rod 4. The sealing device 8 is described later in detail.

In the shock absorber 100 such as described above, of the cylinder 1 and the rod 4, one may be fixed to a vehicle body of the vehicle and the other may be fixed to a suspension of the vehicle.

1B. Sealing Device 8

Figure 2:
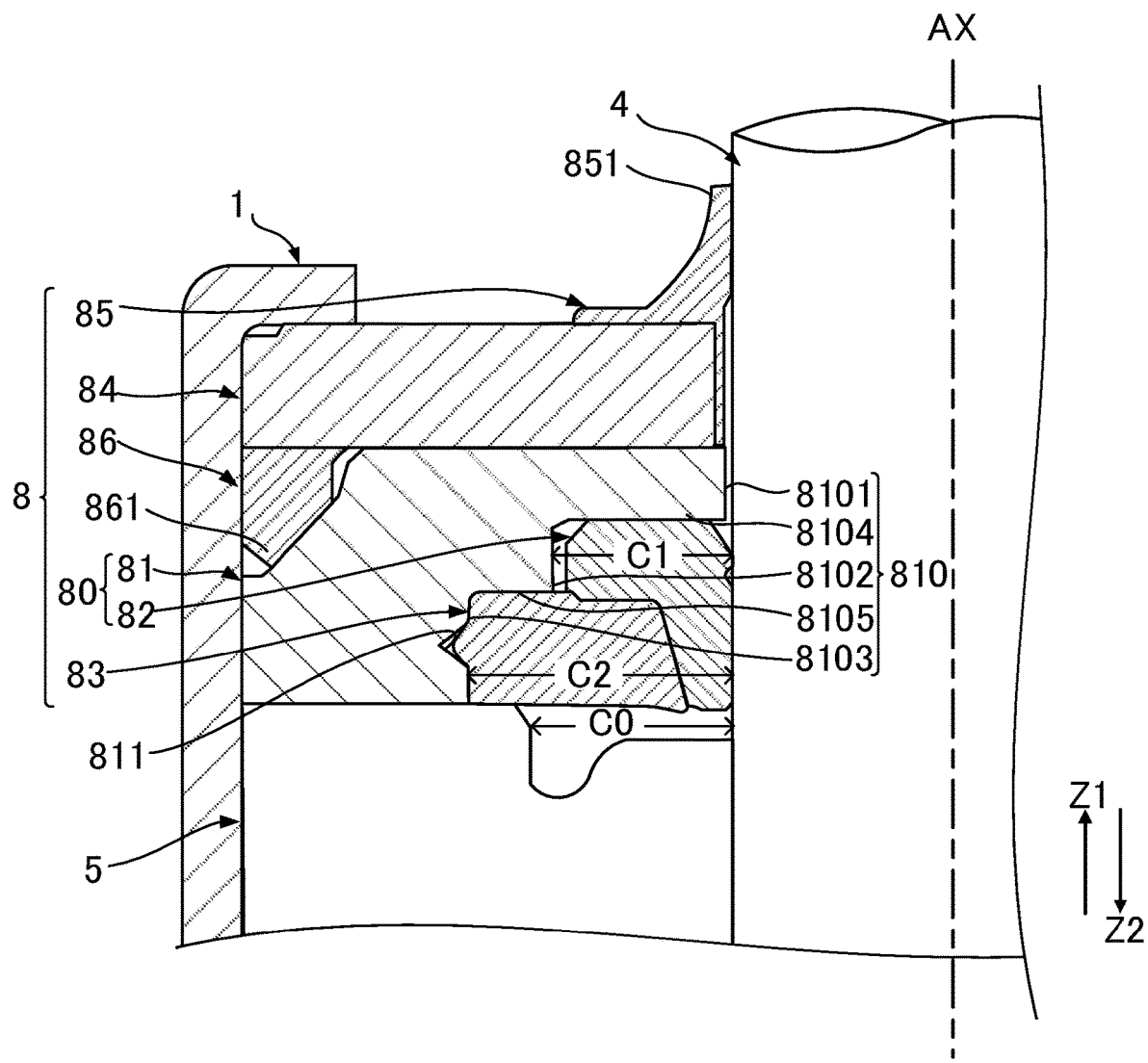
FIG. 2 is a diagram illustrating the sealing device shown in FIG. 1.
Figure 3:
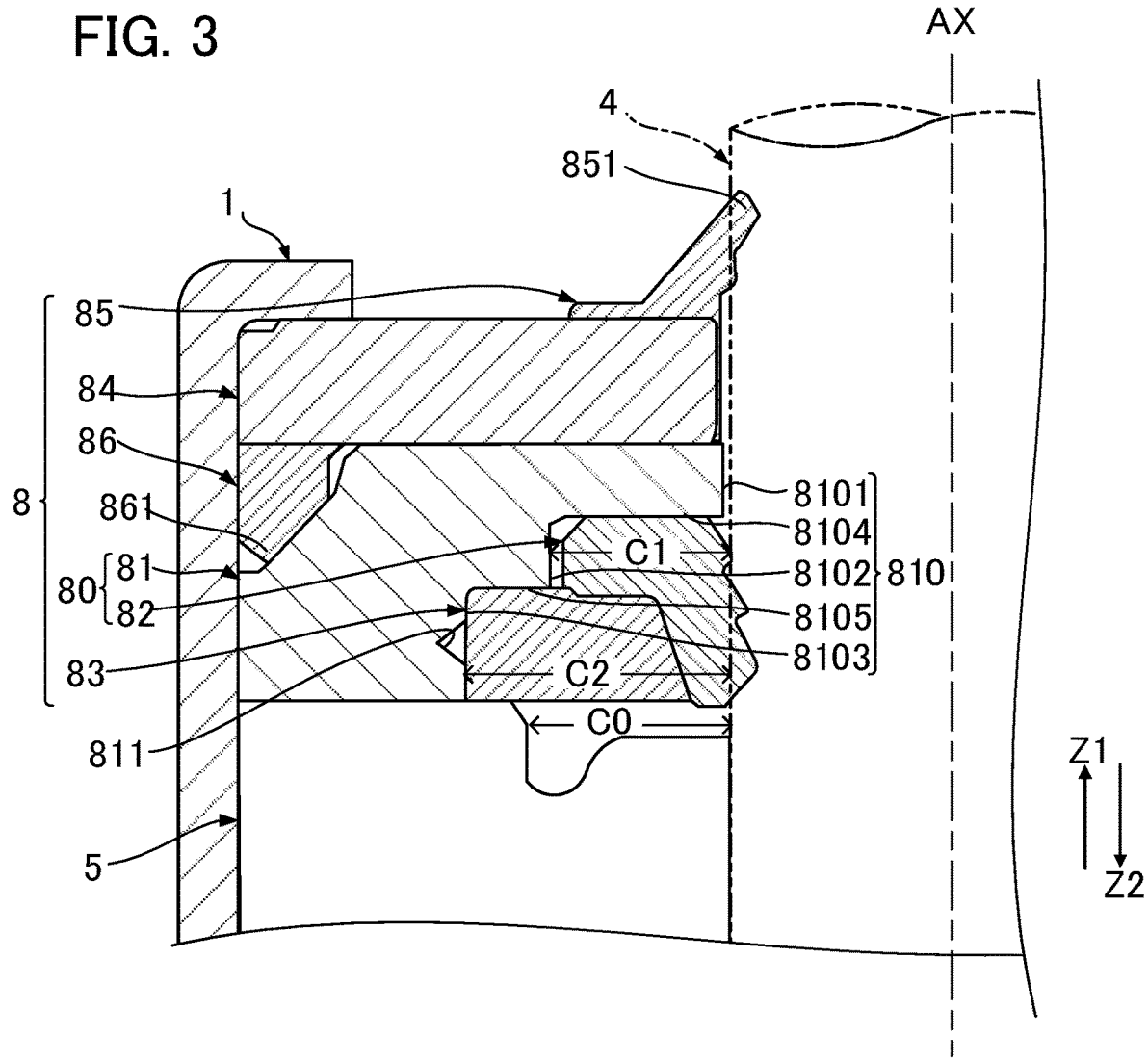
FIG. 3 is a diagram illustrating the sealing device shown in FIG. 1.

FIGS. 2 and 3 are diagrams illustrating the sealing device 8 shown in FIG. 1. As illustrated in FIG. 2, the sealing device 8 includes a metal ring 84, a dust lip 85, an outer circumferential lip 86, a seal housing 81, an inner seal 82, and an outer seal 83. The seal housing 81 and the inner seal 82 constitute a structure 80. The inner seal 82 and the outer seal 83 constitute a seal member that seals a space between the seal housing 81 and the rod 4.

FIG. 2 illustrates the sealing device 8, which is assembled between the cylinder 1 and the rod 4. FIG. 3 illustrates shapes of the dust lip 85, the inner seal 82, and the outer seal 83 in their natural state. FIGS. 6 to 12 referred to later also illustrate these members in their natural state in substantially the same manner as shown in FIG. 3.

The metal ring 84 is annular in shape and is disposed between the rod 4 and the cylinder 1.

The dust lip 85 is made of rubber or another elastic material, and is bonded by cross-linking to a section of the metal ring 84 closer to its inner circumference than its outer circumference. A portion of the dust lip 85 is bonded by cross-linking to the inner circumferential surface of the metal ring 84. As illustrated in FIG. 3, a lip end 851 of the dust lip 85 includes a tightening allowance relative to the outer circumferential surface of the rod 4. As illustrated in FIG. 2, the rod 4 is inserted inside the dust lip 85 so that the lip end 851 is in slidable contact with the rod 4. The dust lip 85 prevents ingress of foreign matter such as dust and dirt into the cylinder 1.

The outer circumferential lip 86 is made of rubber or another elastic material, and is bonded by cross-linking to a section of the metal ring 84 closer to its outer circumference than its inner circumference. A lip end 861 of the outer circumferential lip 86 is inserted into the cylinder 1 to be in slidable contact with the cylinder 1.

The seal housing 81 is made of metal, is annular in shape, and is disposed between the rod 4 and the cylinder 1. The seal housing 81 holds the inner seal 82 and the outer seal 83. The seal housing 81 includes a stepped inner circumferential surface 810. Specifically, the inner circumferential surface 810 includes a first cylindrical surface 8101, a second cylindrical surface 8102, a third cylindrical surface 8103, a first bottom surface 8104, and a second bottom surface 8105.

Each of the first cylindrical surface 8101, the second cylindrical surface 8102, and the third cylindrical surface 8103 extends along the axial line AX over the entire circumference. Each of the first bottom surface 8104 and the second bottom surface 8105 extends radially over the entire circumference. The respective inner diameters of the first cylindrical surface 8101, the second cylindrical surface 8102, and the third cylindrical surface 8103 are different, with the inner diameter of the first cylindrical surface 8101 being the smallest, the inner diameter of the second cylindrical surface 8102 being the second smallest, and the inner diameter of the third cylindrical surface 8103 being the largest. The first bottom surface 8104 connects the first cylindrical surface 8101 and the second cylindrical surface 8102. The second bottom surface 8105 connects the second cylindrical surface 8102 and the third cylindrical surface 8103.

A first space C1 and a second space C2 are formed between the seal housing 81 and the rod 4. The first space C1 is formed at a position in the Z1 direction relative to the second space C2. The first space C1 has an outer diameter smaller than that of the second space C2. In other words, the distance between the seal housing 81 and the rod 4 in the first space C1 is shorter than the distance between the seal housing 81 and the rod 4 in the second space C2. Further, a portion of the inner seal 82 is disposed in the first space C1. In the second space C2, the remaining portions of the inner seal 82 and the outer seal 83 are disposed. The hydraulic oil flows into a clearance C0 between the outer seal 83 and the rod guide 5.

The seal housing 81 has a contact face that is in contact with the outer seal 83. The contact face has a concave portion 811. Specifically, the concave portion 811 is formed on the inner circumferential surface 810 of the seal housing 81. More specifically, the concave portion 811 is a recess formed on the third cylindrical surface 8103 of the inner circumferential surface 810. The concave portion 811 extends circumferentially as a groove, and has a triangular shape as viewed in cross section. The width of the concave portion 811 as viewed in cross section along the axial line AX increases in the direction from the cylinder 1 toward the rod 4.

The inner seal 82 includes a portion that extends radially from the rod 4, and a portion that extends along the axial line AX. As illustrated in FIG. 3, the inner seal 82 includes a tightening allowance relative to the outer circumferential surface of the rod 4. In the first space C1, the inner seal 82 is held in a pressed state between the seal housing 81 and the rod 4. The inner seal 82 is held in a pressed state between the outer seal 83 and the rod 4 in the second space C2. Movement of the inner seal 82 in the Z1 direction is limited by the seal housing 81. The inner seal 82 is pressed in the Z1 direction by a hydraulic pressure of the hydraulic oil that flows into the clearance C0. The inner seal 82 is made of an elastic material such as fluorine rubber or nitrile butadiene rubber (NBR).

The outer seal 83 is disposed between the inner seal 82 and the seal housing 81, and is in contact with the inner seal 82 and the seal housing 81. The outer seal 83 is press-fitted between the inner seal 82 and the seal housing 81. Accordingly, as illustrated in FIG. 2, the inner circumferential edge of the outer seal 83 is slightly displaced in the Z2 direction, when the outer seal 83 is in an assembled state. The outer seal 83 is made of an elastic material such as nitrile butadiene rubber (NBR).

Figure 4:
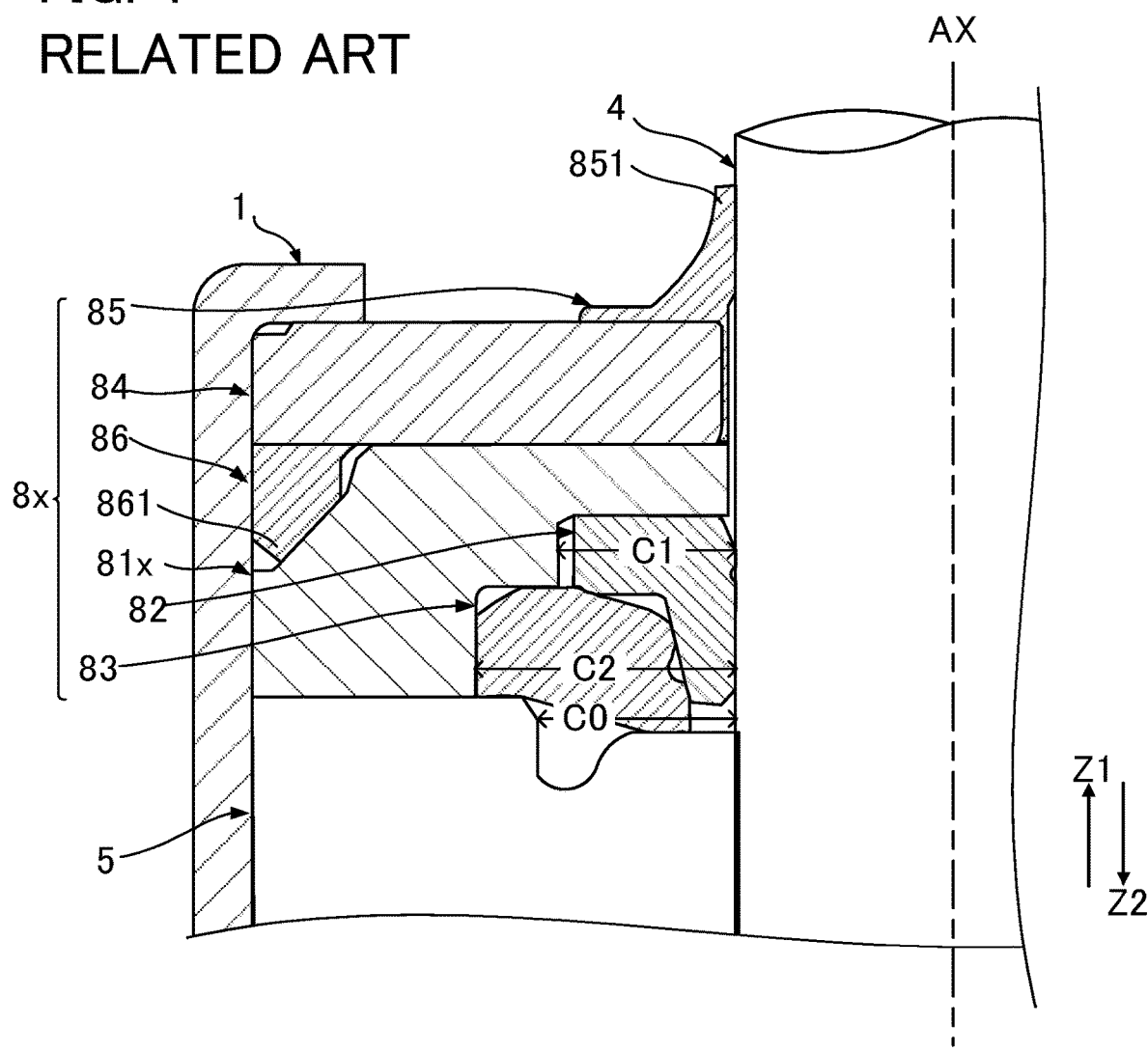
FIG. 4 is an explanatory diagram of a state of an outer seal included in a sealing device of a reference example.

FIG. 4 is an explanatory diagram showing a state of the outer seal 83 included in a sealing device 8x, which is a reference example. The sealing device 8x in the reference example includes a seal housing 81x. The seal housing 81x does not have the concave portion 811 illustrated in FIG. 2 or 3.

When the rod 4 is incorporated into the sealing device 8X, the rod 4 pushes the inner seal 82 in a direction such that the inner seal 82 separates radially from the axial line AX, and the inner seal 82 moves toward the clearance C0. As a result, the outer seal 83 is pushed by the inner seal 82, so that the outer seal 83 partially separates from the inner seal 82 as illustrated in FIG. 4. In this case, contact between the inner seal 82 and the rod 4 becomes unstable, and a pressing force of the inner seal 82 against the rod 4 is reduced. Accordingly, the original sealing capability of the inner seal 82 cannot be maintained, and leakage of the hydraulic oil may occur.

In the sealing device 8 according to the present embodiment, to solve the above problem, the seal housing 81 is provided with the concave portion 811 as illustrated in FIGS. 2 and 3. The seal housing 81 has a contact face that is in contact with the outer seal 83, and the contact face has the concave portion 811, so that when the sealing device 8 is incorporated into the rod 4, the outer seal 83 pushed by the inner seal 82 is partially deformed to penetratingly enter the concave portion 811 of the seal housing 81 as illustrated in FIG. 2. The concave portion 811 functions as a clearance portion into which the outer seal 83 pushed by the inner seal 82 moves. Therefore, the outer seal 83 can be prevented from partially or entirely separating from the inner seal 82, and degradation in sealing properties due to the inner seal 82 can be prevented. By this configuration, the original sealing properties of the sealing device 8 can be maintained.

2. Second Embodiment

A second embodiment will now be described. In the modes exemplified below, elements having functions substantially the same as those of the first embodiment are denoted by reference signs used in the description of the first embodiment, and detailed explanation thereof is omitted as appropriate.

Figure 5:
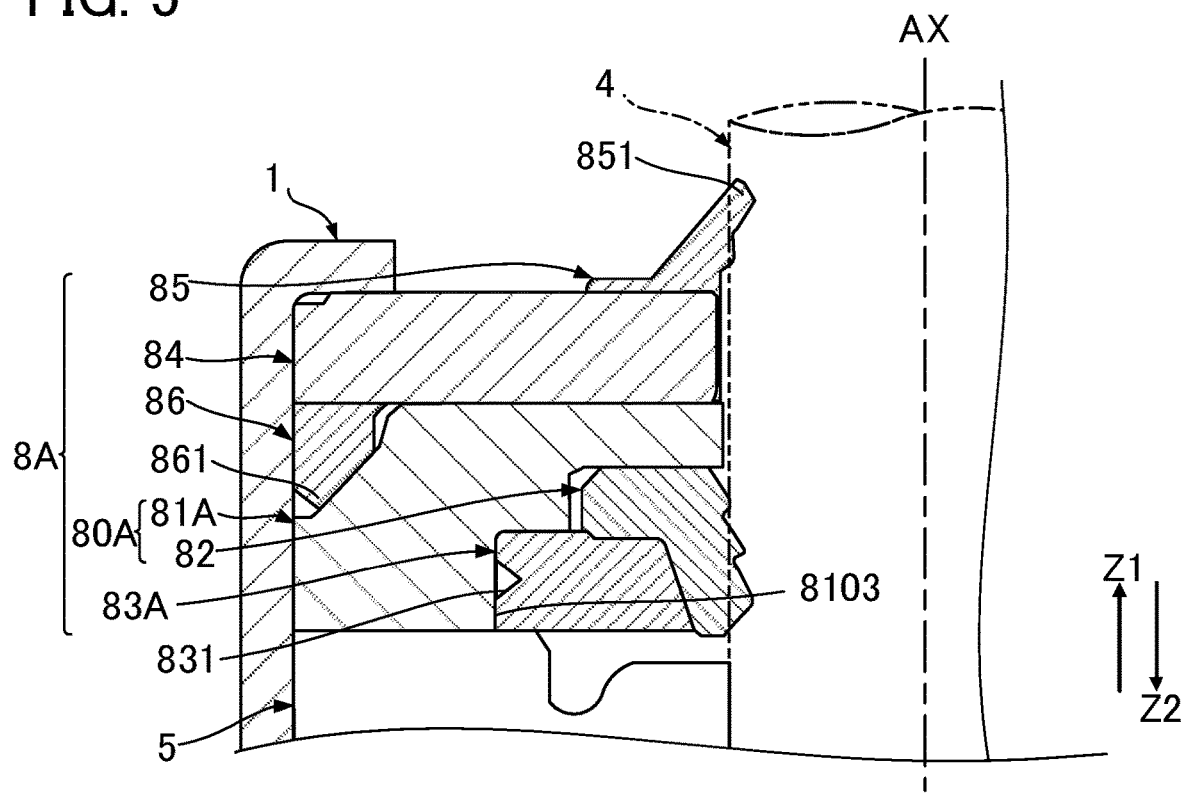
FIG. 5 is a diagram illustrating a portion of a sealing device according to a second embodiment.

FIG. 5 is a diagram illustrating a portion of a sealing device 8A according to the second embodiment. Differences between the sealing device 8A according to the second embodiment and the sealing device 8 according to the first embodiment are described below, and explanation of matters that are substantially the same is omitted as appropriate.

The sealing device 8A illustrated in FIG. 5 includes an outer seal 83A with a contact face that is in contact with a seal housing 81A. The contact face has a concave portion 831. Specifically, the concave portion 831 is a recess formed on an outer circumferential surface of the outer seal 83A. The concave portion 831 extends circumferentially. The concave portion 831 is a groove that has a triangular shape as viewed in cross section. The width of the concave portion 831 as viewed in cross section along the axial line AX increases in the direction from the rod 4 toward the cylinder 1. A structure 80A includes the seal housing 81A. Unlike the first embodiment, the seal housing 81A does not have the concave portion 811.

The outer seal 83A has a contact face that is in contact with the seal housing 81A, and the contact face has the concave portion 831. Consequently, although not illustrated in the drawings, when the sealing device 8A is incorporated into the rod 4, the outer seal 83A pushed by the inner seal 82 is pressed against an inner circumferential surface of the seal housing 81A, and thus deformed. This deformation causes the concave portion 831 to be deformed and pressed against the inner circumferential surface of the seal housing 81A. Therefore, the outer seal 83A can be prevented from partially or entirely separating from the inner seal 82. This prevents degradation in sealing properties due to the inner seal 82. By this configuration, the original sealing properties of the sealing device 8A can be maintained.

3. Third Embodiment

A third embodiment will now be described. In the modes exemplified below, elements having functions substantially the same as those of the first embodiment are denoted by reference signs used in the description of the first embodiment, and detailed explanation thereof is omitted as appropriate.

Figure 6:
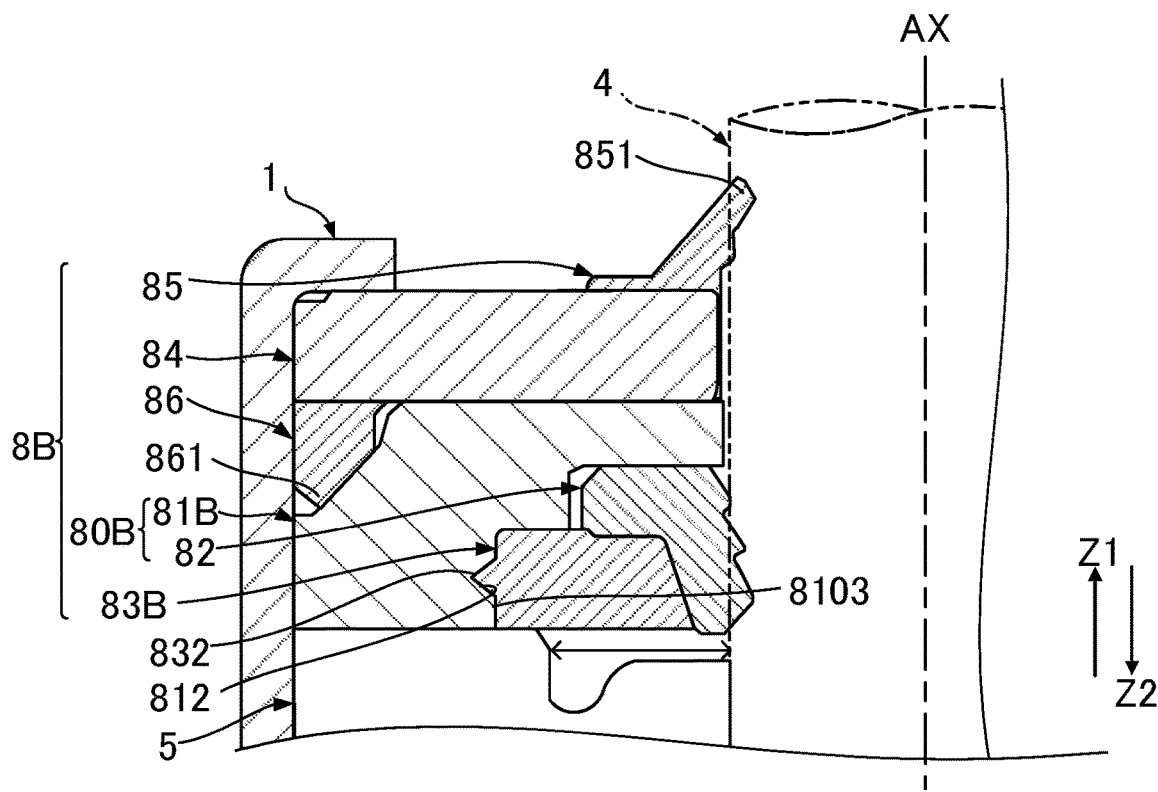
FIG. 6 is a diagram illustrating a portion of a sealing device according to a third embodiment.

FIG. 6 is a diagram illustrating a portion of a sealing device 8B according to the third embodiment. Differences between the sealing device 8B according to the third embodiment and the sealing device 8 according to the first embodiment are described below and explanation of substantially the same matters is omitted as appropriate.

The sealing device 8B illustrated in FIG. 6 has a structure 80B that includes a seal housing 81B. The seal housing 81B has a second portion 812 that is a concave portion. The second portion 812 has substantially the same configuration as the concave portion 811 according to the first embodiment. The seal housing 81B has a contact face that is in contact with an outer circumferential surface of an outer seal 83B. The second portion 812 is formed on the contact face. Specifically, the second portion 812 is formed on the third cylindrical surface 8103. The second portion 812 extends circumferentially. The second portion 812 is a groove that is triangular in shape as viewed in cross section.

The outer seal 83B has a first portion 832 that is a convex portion. The first portion 832 fits in the second portion 812. The outer seal 83B has a contact face that is in contact with the third cylindrical surface 8103. The first portion 832 is formed on the contact face. The first portion 832 extends circumferentially. The first portion 832 is a convex portion that is triangular in shape as viewed in cross section.

As described above, the seal housing 81B has the second portion 812, and the outer seal 83B has the first portion 832 that fits in the second portion 812. By this configuration, when the sealing device 8B is incorporated into the rod 4, the outer seal 83B is less likely to come away from the structure 80B. Accordingly, the outer seal 83B can be prevented from partially or entirely separating from the inner seal 82. This prevents degradation in sealing properties due to the inner seal 82. By this configuration, the original sealing properties of the sealing device 8B can be maintained.

4. Fourth Embodiment

A fourth embodiment will now be described. In the modes exemplified below, elements having functions substantially the same as those of the first embodiment are denoted by reference signs used in the description of the first embodiment, and detailed explanation thereof is omitted as appropriate.

Figure 7:
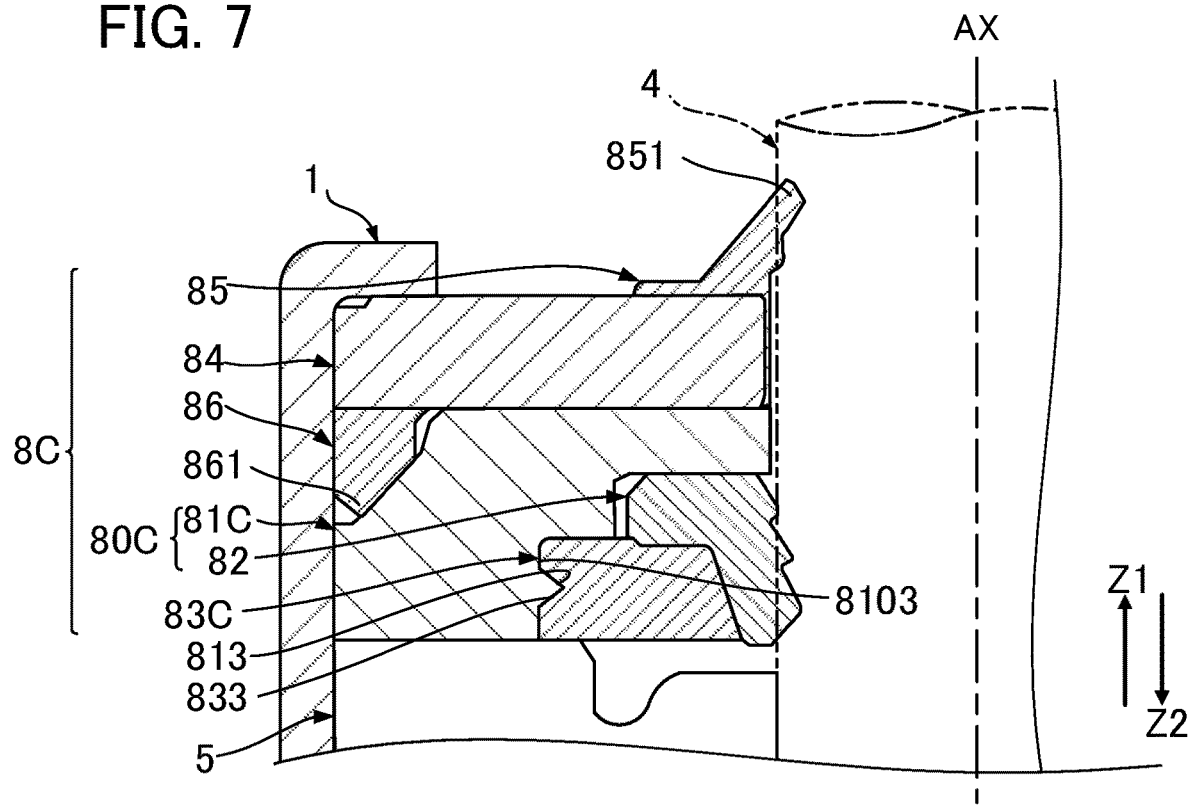
FIG. 7 is a diagram illustrating a portion of a sealing device according to a fourth embodiment.

FIG. 7 is a diagram illustrating a portion of a sealing device 8C according to the fourth embodiment. Differences between the sealing device 8C according to the fourth embodiment and the sealing device 8 according to the first embodiment are described below, and explanation of substantially the same matters is omitted as appropriate.

The sealing device 8C illustrated in FIG. 7 has a structure 80C that includes a seal housing 81C. The seal housing 81C has a second portion 813 that is a convex portion. The seal housing 81C has a contact face that is in contact with an outer circumferential surface of an outer seal 83C. The second portion 813 is formed on the contact face. Specifically, the second portion 813 is formed on the third cylindrical surface 8103. The second portion 813 extends circumferentially. The second portion 813 is a convex portion that is triangular in shape as viewed in cross section.

The outer seal 83C has a first portion 833 that is a concave portion. The first portion 833 fits in the second portion 813. The outer seal 83C has a contact face that is in contact with the third cylindrical surface 8103. The first portion 833 is formed on the contact face. The first portion 833 extends circumferentially. The first portion 833 is a groove that is triangular in shape as viewed in cross section.

As described above, the seal housing 81C has the second portion 813, and the outer seal 83C has the first portion 833 that fits in the second portion 813. By this configuration, when the sealing device 8C is incorporated into the rod 4, the outer seal 83C is less likely to come away from the structure 80C. Accordingly, the outer seal 83C can be prevented from partially or entirely separating from the inner seal 82. This prevents degradation in sealing properties due to the inner seal 82. By this configuration, the original sealing properties of the sealing device 8C can be maintained.

5. Fifth Embodiment

A fifth embodiment will now be described. In the modes exemplified below, elements having functions substantially the same as those of the first embodiment are denoted by reference signs used in the description of the first embodiment, and detailed explanation thereof is omitted as appropriate.

Figure 8:
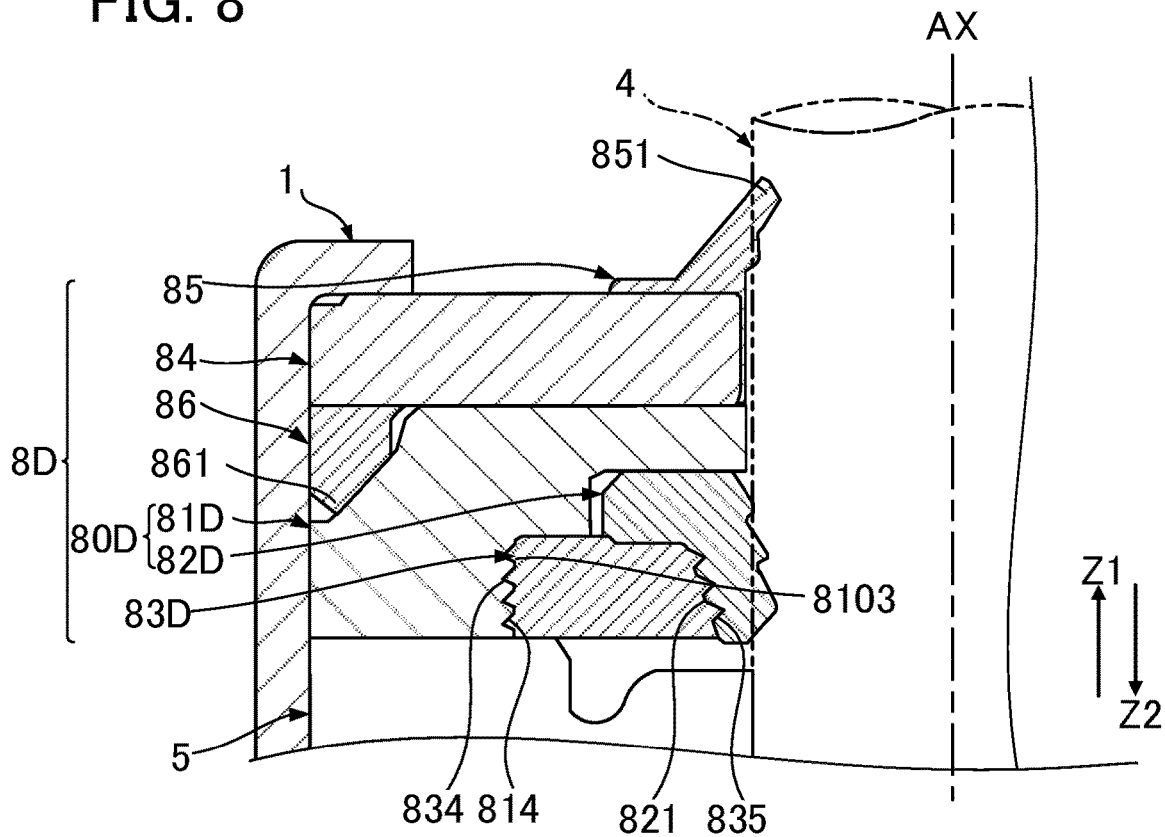
FIG. 8 is a diagram illustrating a portion of a sealing device according to a fifth embodiment.

FIG. 8 is a diagram illustrating a portion of a sealing device 8D according to the fifth embodiment. Differences between the sealing device 8D according to the fifth embodiment and the sealing device 8 according to the first embodiment are described below, and explanation of substantially the same matters is omitted as appropriate.

The sealing device 8D illustrated in FIG. 8 has a structure 80D that includes a seal housing 81D. The seal housing 81D has a second portion 814 that includes a plurality of concave portions and a plurality of convex portions. The seal housing 81D has a contact face that is in contact with an outer circumferential surface of an outer seal 83D. The second portion 814 is formed on the contact face. Specifically, the second portion 814 is formed on the third cylindrical surface 8103. The second portion 814 extends circumferentially.

An inner seal 82D has a second portion 821 that includes a plurality of concave portions and a plurality of convex portions. The inner seal 82D has a contact face that is in contact with an inner circumferential surface of the outer seal 83D. The second portion 821 is formed on the contact face. Specifically, the second portion 821 is formed on an outer circumferential surface of the inner seal 82D. The second portion 821 extends circumferentially.

The outer seal 83D has first portions 834 and 835. Each of the first portions 834 and 835 includes a plurality of concave portions and a plurality of convex portions. The first portion 834 fits in the second portion 814, and the first portion 835 fits in the second portion 821. The outer seal 83D has a contact face that is in contact with the third cylindrical surface 8103. The first portion 834 is formed on the contact face. Specifically, the first portion 834 is formed on the outer circumferential surface of the outer seal 83D. The outer seal 83D has a contact face that is in contact with the inner seal 82D. The first portion 835 is formed on the contact face. Specifically, the first portion 835 is formed on the inner circumferential surface of the outer seal 83D. Each of the first portions 834 and 835 extends circumferentially.

As described above, the seal housing 81D has the second portion 814, and the inner seal 82D has the second portion 821. The outer seal 83D has the first portion 834 that fits in the second portion 814, and the first portion 835 that fits in the second portion 821. By this configuration, when the sealing device 8D is incorporated into the rod 4, the outer seal 83D is less likely to come away from the structure 80D. Accordingly, the outer seal 83D can be prevented from partially or entirely separating from the inner seal 82D. This prevents degradation in sealing properties due to the inner seal 82D. By this configuration, the original sealing properties of the sealing device 8D can be maintained.

The outer seal 83D has the first portions 834 and 835. By this configuration, the outer seal 83D can further be prevented from partially or entirely separating from the inner seal 82D, compared to the configuration in which the outer seal 83D has one only of the first portions 834 and 835.

6. Sixth Embodiment

A sixth embodiment will now be described. In the modes exemplified below, elements having functions substantially the same as those of the first embodiment are denoted by reference signs used in the description of the first embodiment, and detailed explanation thereof is omitted as appropriate.

Figure 9:
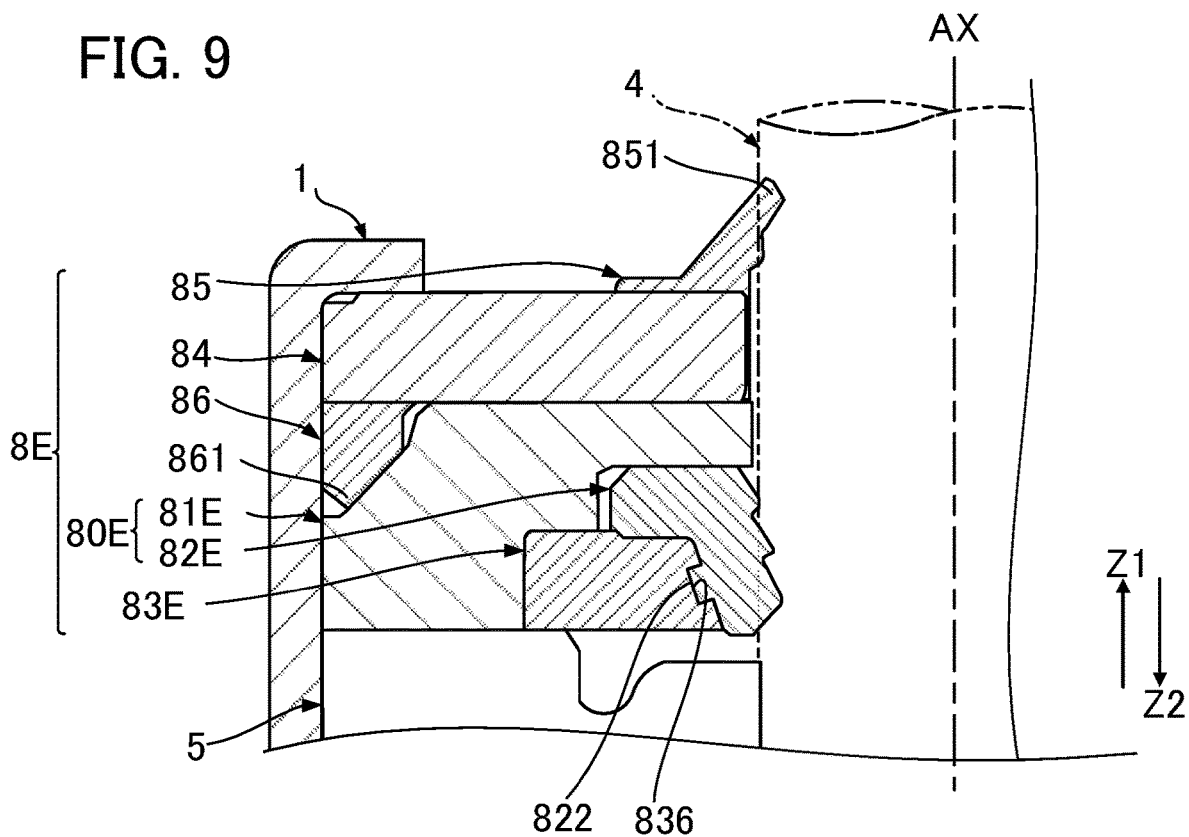
FIG. 9 is a diagram illustrating a portion of a sealing device according to a sixth embodiment.

FIG. 9 is a diagram illustrating a portion of a sealing device 8E according to the sixth embodiment. Differences between the sealing device 8E according to the sixth embodiment and the sealing device 8 according to the first embodiment are described below, and explanation of substantially the same matters is omitted as appropriate.

The sealing device 8E illustrated in FIG. 9 has a structure 80E that includes an inner seal 82E. The inner seal 82E has a second portion 822 that is a convex portion. The inner seal 82E has a contact face that is in contact with an inner circumferential surface of an outer seal 83E. The second portion 822 is formed on the contact face. Specifically, the second portion 822 is formed on an outer circumferential surface of the inner seal 82E. The second portion 822 extends circumferentially. The second portion 822 is a convex portion that is rectangular in shape as viewed in cross section. Unlike the first embodiment, a seal housing 81E does not have the concave portion 811.

The outer seal 83E has a first portion 836 that is a concave portion. The first portion 836 fits in the second portion 822. The outer seal 83E has a contact face that is in contact with the inner seal 82E. The first portion 836 is formed on the contact face. Specifically, the first portion 836 is formed on the inner circumferential surface of the outer seal 83E. The first portion 836 extends circumferentially. The first portion 836 is a groove that is rectangular in shape as viewed in cross section.

As described above, the inner seal 82E has the second portion 822, and the outer seal 83E has the first portion 836 that fits in the second portion 822. By this configuration, when the sealing device 8E is incorporated into the rod 4, the outer seal 83E is less likely to come away from the inner seal 82E. Accordingly, the outer seal 83E can be prevented from partially or entirely separating from the inner seal 82E. This prevents degradation in sealing properties due to the inner seal 82E. By this configuration, the original sealing properties of the sealing device 8E can be maintained.

Particularly, the inner seal 82E fits in the outer seal 83E by way of the first portion 836 and the second portion 822, so that the inner seal 82E and the outer seal 83E can be integrated as a single piece. Accordingly, the outer seal 83E can be effectively prevented from partially or entirely separating from the inner seal 82E.

7. Seventh Embodiment

A seventh embodiment will now be described. In the modes exemplified below, elements having functions substantially the same as those of the first embodiment are denoted by reference signs used in the description of the first embodiment, and detailed explanation thereof is omitted as appropriate.

Figure 10:
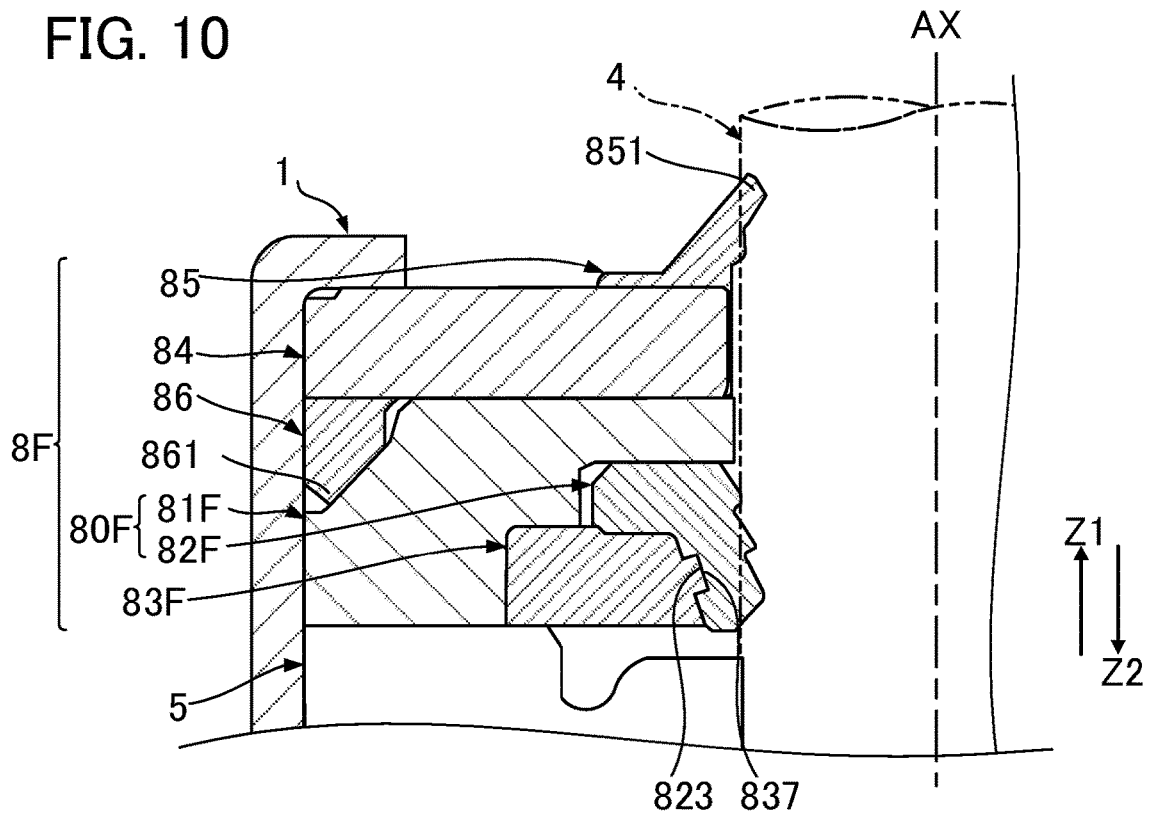
FIG. 10 is a diagram illustrating a portion of a sealing device according to a seventh embodiment.

FIG. 10 is a diagram illustrating a portion of a sealing device 8F according to the seventh embodiment. Differences between the sealing device 8F according to the seventh embodiment and the sealing device 8 according to the first embodiment are described below, and explanation of substantially the same matters is omitted as appropriate.

The sealing device 8F illustrated in FIG. 10 has a structure 80F that includes an inner seal 82F. The inner seal 82F has a second portion 823 that is a concave portion. The inner seal 82F has a contact face that is in contact with an inner circumferential surface of an outer seal 83F. The second portion 823 is formed on the contact face. Specifically, the second portion 823 is formed on an outer circumferential surface of the inner seal 82F. The second portion 823 extends circumferentially. The second portion 823 is a groove that is rectangular in shape as viewed in cross section. Unlike the first embodiment, a seal housing 81F does not have the concave portion 811.

The outer seal 83F has a first portion 837 that is a convex portion. The first portion 837 fits in the second portion 823. The outer seal 83F has a contact face that is in contact with the outer circumferential surface of the inner seal 82F. The first portion 837 is formed on the contact face. Specifically, the first portion 837 is formed on the inner circumferential surface of the outer seal 83F. The first portion 837 extends circumferentially. The first portion 837 is a projection that is rectangular in shape as viewed in cross section.

As described above, the inner seal 82F has the second portion 823, and the outer seal 83F has the first portion 837 that fits in the second portion 823. By this configuration, when the sealing device 8F is incorporated into the rod 4, the outer seal 83F is less likely to come away from the inner seal 82F. Accordingly, the outer seal 83F can be prevented from partially or entirely separating from the inner seal 82F. This prevents degradation in sealing properties due to the inner seal 82F. By this configuration, the original sealing properties of the sealing device 8F can be maintained.

Particularly, the inner seal 82F fits in the outer seal 83F by way of the first portion 837 and the second portion 823, so that the inner seal 82F and the outer seal 83F can be integrated as a single piece. Accordingly, the outer seal 83F can be effectively prevented from partially or entirely separating from the inner seal 82F.

8. Eighth Embodiment

An eighth embodiment will now be described. In the modes exemplified below, elements having functions substantially the same as those of the first embodiment are denoted by reference signs used in the description of the first embodiment, and detailed explanation thereof is omitted as appropriate.

Figure 11:
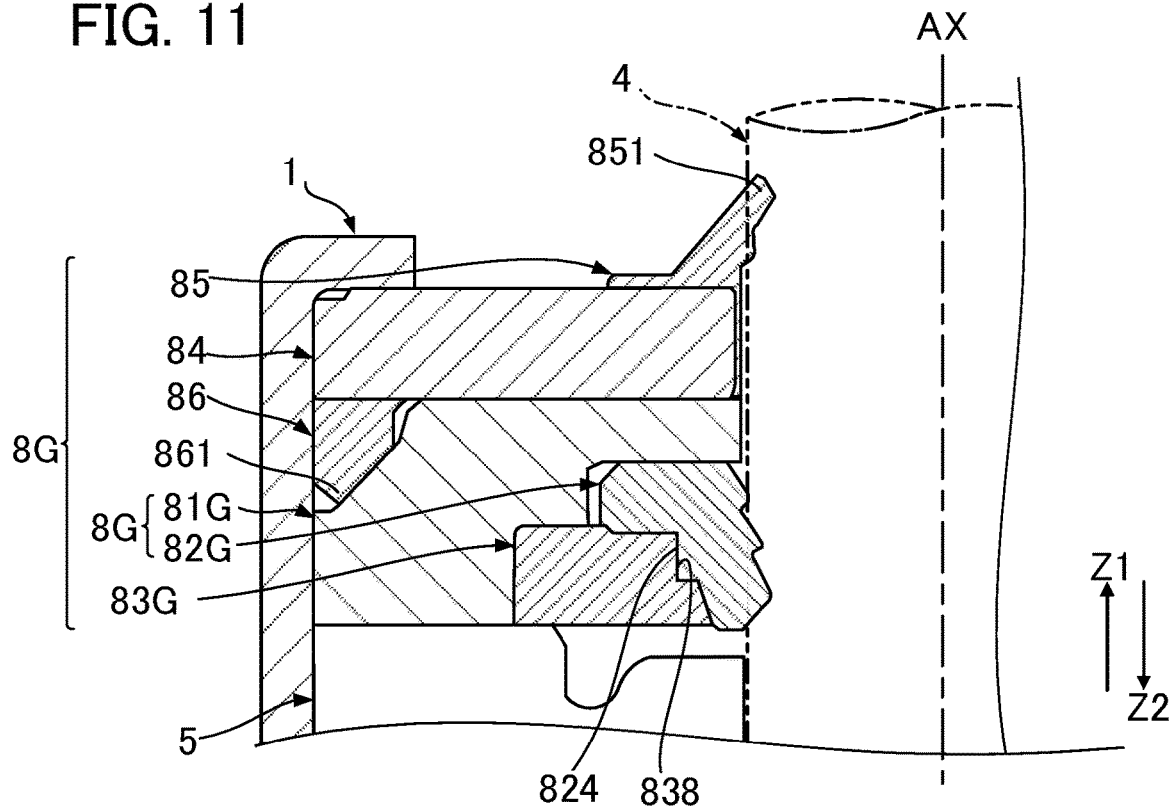
FIG. 11 is a diagram illustrating a portion of a sealing device according to an eighth embodiment.

FIG. 11 is a diagram illustrating a portion of a sealing device 8G according to the eighth embodiment. Differences between the sealing device 8G according to the eighth embodiment and the sealing device 8 according to the first embodiment are described below, and explanation of substantially the same matters is omitted as appropriate.

The sealing device 8G illustrated in FIG. 11 has a structure 80G that includes an inner seal 82G. The inner seal 82G has a second portion 824. The second portion 824 is a convex portion. The inner seal 82G has a contact face that is in contact with an inner circumferential surface of an outer seal 83G. The second portion 824 is formed on the contact face. Specifically, the second portion 824 is formed on an outer circumferential surface of the inner seal 82G. The second portion 824 extends circumferentially. A seal housing 81G does not have the concave portion 811 according to the first embodiment.

The outer seal 83G has a first portion 838. The first portion 838 is a concave portion. The first portion 838 fits in the second portion 824. The outer seal 83G has a contact face that is in contact with the outer circumferential surface of the inner seal 82G. The first portion 838 is formed on the contact face. Specifically, the first portion 838 is formed on the inner circumferential surface of the outer seal 83G. The first portion 838 extends circumferentially.

The second portion 824 may be regarded as a step constituted of a concave portion and a convex portion. The first portion 838 may be regarded as a step constituted of a concave portion and a convex portion. The second portion 824 may be regarded as a concave portion, while the first portion 838 may be regarded as a convex portion.

As described above, the inner seal 82G has the second portion 824, and the outer seal 83G has the first portion 838 that fits in the second portion 824. By this configuration, when the sealing device 8G is incorporated into the rod 4, the outer seal 83G is less likely to come away from the inner seal 82G. Accordingly, the outer seal 83G can be prevented from partially or entirely separating from the inner seal 82G. This prevents degradation in sealing properties due to the inner seal 82G. By this configuration, the original sealing properties of the sealing device 8G can be maintained.

Particularly, the inner seal 82G fits in the outer seal 83G by way of the first portion 838 and the second portion 824, so that the inner seal 82G and the outer seal 83G can be integrated as a single piece. Accordingly, the outer seal 83G can be effectively prevented from partially or entirely separating from the inner seal 82G.

9. Ninth Embodiment

A ninth embodiment will now be explained. In the modes exemplified below, elements having functions substantially the same as those of the first embodiment are denoted by reference signs used in the explanation of the first embodiment, and detailed explanation thereof is omitted as appropriate.

Figure 12:
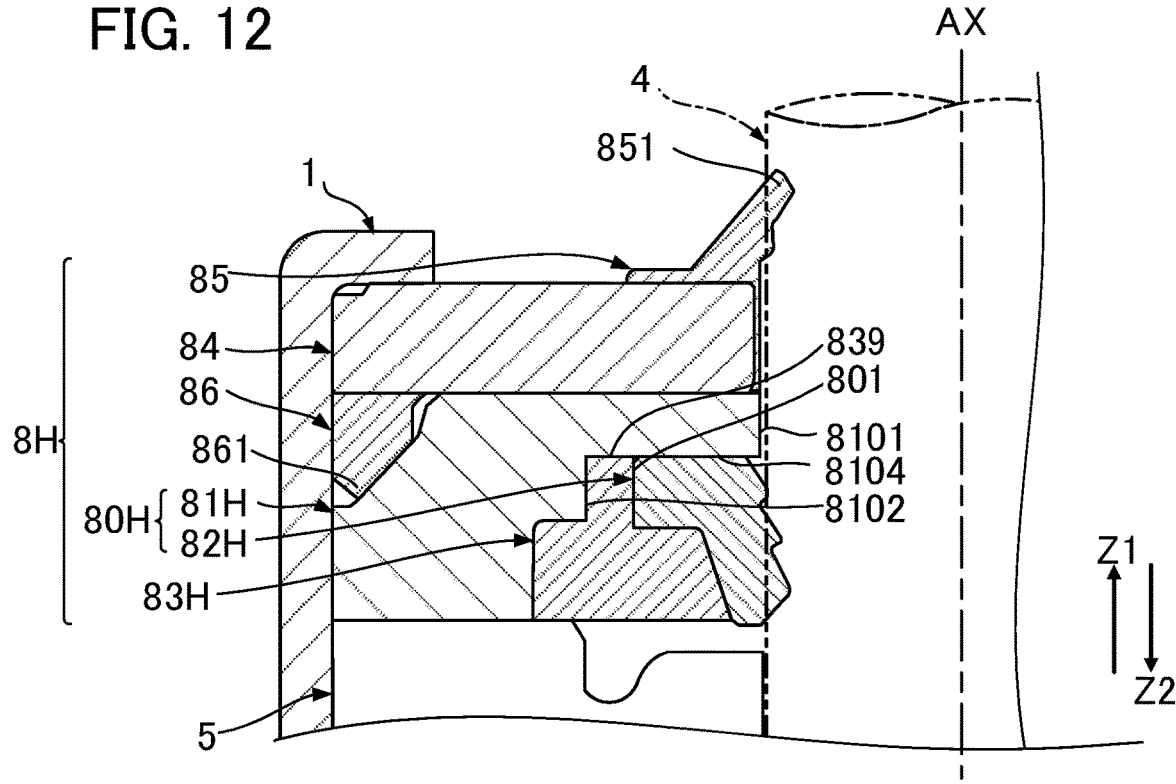
FIG. 12 is a diagram illustrating a portion of a sealing device according to a ninth embodiment.

FIG. 12 is a diagram illustrating a portion of a sealing device 8H according to the ninth embodiment. Differences between the sealing device 8H according to the ninth embodiment and the sealing device 8 according to the first embodiment are described below, and explanation of substantially the same matters is omitted as appropriate.

The sealing device 8H illustrated in FIG. 12 has a structure 80H that includes a second portion 801. The second portion 801 is a concave portion included in the structure 80H. The second portion 801 is provided between a seal housing 81H and an inner seal 82H. The structure 80H has a contact face that is in contact with an outer seal 83H. The second portion 801 is formed on the contact face. The second portion 801 extends circumferentially.

The outer seal 83H has a first portion 839. The first portion 839 is a convex portion. The first portion 839 fits in the second portion 801. The outer seal 83H has a contact face that is in contact with the structure 80H. The first portion 839 is formed on the contact face. The first portion 839 extends circumferentially.

As described above, the structure 80H has the second portion 801, and the outer seal 83H has the first portion 839 that fits in the second portion 801. By this configuration, when the sealing device 8H is incorporated into the rod 4, the outer seal 83H is less likely to come away from the structure 80H. Accordingly, the outer seal 83H can be prevented from partially or entirely separating from the structure 80H. Consequently, the outer seal 83H can be prevented from partially or entirely separating from the inner seal 82H. This prevents degradation in sealing properties due to the inner seal 82H. By this configuration, the original sealing properties of the sealing device 8H can be maintained.

Particularly, the second portion 801 is provided between the seal housing 81H and the inner seal 82H, and the first portion 839 fits in the second portion 801. By this configuration, the first portion 839 is interposed between the seal housing 81H and the inner seal 82H. Accordingly, the outer seal 83H can be effectively prevented from partially or entirely separating from the structure 80H.

The present invention is described above based on the preferred embodiments. However, the present invention is not limited to the preferred embodiments. The configurations of elements of the present invention can be replaced with configurations that provide substantially the same functions as those of the preferred embodiments, and appropriate changes can be made thereto. Further, any of the configurations of the preferred embodiments may be combined with each other.

The sealing device of the present invention may be applied to an extension mechanism other than a shock absorber. For example, the invention may be applied to a gas stay.

The invention claimed is:

1. A sealing device that seals a cylinder and a rod, the cylinder having a space extending along an axial line, the rod being inserted into the space, wherein the rod is configured to reciprocate along the axial line, the sealing device comprising:
    a seal housing disposed between the cylinder and the rod;
    an inner seal disposed between the rod and the seal housing, the inner seal being in contact with the rod; and
    an outer seal disposed between the inner seal and the seal housing, the outer seal being in contact with both the inner seal and the seal housing,
    wherein the seal housing has a contact face that is in contact with the outer seal, such that the reciprocation of the rod along the axial line does not separate the outer seal from the inner seal, the contact face having a concave portion, wherein the outer seal has no convex portion that fits into the concave portion, and
    wherein the outer seal is made of elastic material and is configured to be partially deformed to penetratingly enter the concave portion, with the outer seal being incorporated in a space between the cylinder and the rod.

2. A sealing device that seals a cylinder and a rod, the cylinder having a space extending along an axial line, the rod being inserted into the space, the sealing device comprising:
    a seal housing disposed between the cylinder and the rod;
    an inner seal disposed between the rod and the seal housing, the inner seal being in contact with the rod; and
    an outer seal disposed between the inner seal and the seal housing, the outer seal being in contact with both the inner seal and the seal housing,
    wherein:
    the seal housing has a concave portion,
    the outer seal has a first contact face that is in contact with the seal housing, the first contact face having a convex portion that fits into the concave portion of the seal housing,
    the first contact face of the outer seal extends parallel to the axial line, and
    the concave portion of the seal housing has a first angled portion extending in a first radially outward direction, and a second angled portion extending in a second radially outward direction that intersects with the first angled portion such that the convex portion of the first contact surface is sandwiched between the first angled portion and the second angled portion.

3. The sealing device according to claim 2, wherein:
    the outer seal has a second contact face that is in contact with the inner seal, with a concave portion or a convex portion being provided on the second contact face, and
    the inner seal has a convex portion that fits into the concave portion of the second contact face, or a concave portion that receives the convex portion of the second contact face such that the convex portion of the second contact face fits into the concave portion of the inner seal.

4. A sealing device that seals a cylinder and a rod, the cylinder having a space extending along an axial line, the rod being inserted into the space, wherein the rod is configured to reciprocate along the axial line, the sealing device comprising:

a seal housing disposed between the cylinder and the rod;

an inner seal disposed between the rod and the seal housing, the inner seal being in contact with the rod; and an outer seal disposed between the inner seal and the seal housing, the outer seal being in contact with both the inner seal and the seal housing, wherein the outer seal has a contact face that is in contact with the seal housing, such that the reciprocation of the rod along the axial line does not separate the outer seal from the inner seal, the contact face having a concave portion, wherein the seal housing has no convex portion that fits into the concave portion, and wherein the outer seal is made of elastic material and the concave portion of the outer seal is configured to be deformed by being pressed against an inner circumferential surface of the seal housing, with the outer seal being incorporated in a space between the cylinder and the rod.

* * * * *